(12) United States Patent
Tanbour et al.

(10) Patent No.: US 8,490,580 B2
(45) Date of Patent: Jul. 23, 2013

(54) WATER HEATERS WITH SEALED DOOR ASSEMBLY

(75) Inventors: Emadeddin Y. Tanbour, Johnson City, TN (US); Rodney R. Syler, Franklin, TN (US); Mark A. Murphy, Nashville, TN (US); Marcus E. McAnally, Nashville, TN (US)

(73) Assignee: American Water Heater Company, Johnson City, TN (US)

( * ) Notice: Subject to any disclaimer, the term of this patent is extended or adjusted under 35 U.S.C. 154(b) by 1023 days.

(21) Appl. No.: 12/260,259

(22) Filed: Oct. 29, 2008

(65) Prior Publication Data

US 2010/0101508 A1  Apr. 29, 2010

(51) Int. Cl.
*F22B 37/36* (2006.01)
*F22B 37/40* (2006.01)

(52) U.S. Cl.
USPC .................. 122/13.01; 122/494; 122/504

(58) Field of Classification Search
USPC .............. 122/13.01, 14.21, 14.31, 17.1, 19.2, 122/494, 504; 285/136.1, 141.1, 189, 215, 285/226, 227, 139.1, 139.2
See application file for complete search history.

(56) References Cited

U.S. PATENT DOCUMENTS

| | | | |
|---|---|---|---|
| 196,084 A | 10/1877 | Guyer | |
| 1,253,065 A | 1/1918 | Looze | |
| 2,070,535 A | 2/1937 | Hansen | |
| 2,334,398 A | 11/1943 | Farren et al. | |
| 3,209,991 A | 10/1965 | Sauber | |
| 3,827,727 A | 8/1974 | Moebius | |
| 3,871,800 A | 3/1975 | Slayton | |
| 3,920,375 A | 11/1975 | Sanderson et al. | |
| 4,026,006 A | 5/1977 | Moebius | |
| 4,061,367 A | 12/1977 | Moebius | |
| 4,606,562 A | 8/1986 | Saraceno | |
| 4,669,448 A | 6/1987 | West | |
| 4,858,968 A | 8/1989 | Moebius | |
| 4,924,816 A | 5/1990 | Moore, Jr. et al. | |
| 4,973,482 A * | 11/1990 | Morris et al. | 426/307 |

(Continued)

FOREIGN PATENT DOCUMENTS

| | | |
|---|---|---|
| CA | 2228569 | 8/1999 |
| CA | 2475065 | 11/2002 |

(Continued)

OTHER PUBLICATIONS

Rheem Design Pictures, dated May 19, 2008.

(Continued)

*Primary Examiner* — Gregory A Wilson
(74) *Attorney, Agent, or Firm* — Michael Best & Friedrich LLP

(57) ABSTRACT

A water heater door assembly includes a base plate sized and shaped to substantially sealingly cover an access opening in a water heater combustion chamber and has at least one opening through which a fuel supply line extends at least partly between a burner in the combustion chamber and a gas control valve, and a flexible seal positioned at least partly within the opening including an engaging portion substantially sealed to an edge portion of the opening, and a through hole that is shaped to receive the fuel supply and has a size slightly smaller than the size of an outer dimension of the fuel supply line such that the flexible seal and the fuel supply line are friction fit together to form a seal.

13 Claims, 8 Drawing Sheets

U.S. PATENT DOCUMENTS

| | | | |
|---|---|---|---|
| 5,020,512 A | 6/1991 | Vago et al. | |
| 5,386,923 A | 2/1995 | Nakashima et al. | |
| 5,934,269 A | 8/1999 | Wilson | |
| 5,971,444 A | 10/1999 | Hawkins | |
| 6,109,216 A | 8/2000 | Reynolds et al. | |
| 6,216,643 B1 | 4/2001 | Reynolds et al. | |
| 6,230,665 B1 | 5/2001 | Reynolds et al. | |
| 6,257,846 B1 | 7/2001 | Muramatsu et al. | |
| 6,269,779 B2 | 8/2001 | Overbey, Jr. | |
| 6,295,952 B1* | 10/2001 | Reynolds et al. | 122/14.31 |
| 6,302,062 B2* | 10/2001 | Overbey et al. | 122/13.01 |
| 6,439,171 B1 | 8/2002 | McCall | |
| 6,446,582 B1 | 9/2002 | Duong et al. | |
| 6,517,344 B2 | 2/2003 | Scanlon | |
| 6,547,558 B2 | 4/2003 | McCall | |
| 6,554,322 B2* | 4/2003 | Duong et al. | 285/305 |
| 6,554,610 B2 | 4/2003 | McCall | |
| 6,698,385 B1* | 3/2004 | Lesage | 122/13.01 |
| 7,000,847 B2* | 2/2006 | Alvarado | 236/15 BE |
| 7,032,543 B1 | 4/2006 | Akkala et al. | |
| 7,198,304 B2* | 4/2007 | Angus | 285/136.1 |
| 7,946,257 B2 | 5/2011 | Hicks et al. | |
| 8,091,927 B2 | 1/2012 | Scanlon | |
| 2002/0068253 A1 | 6/2002 | Scanlon | |
| 2007/0117060 A1* | 5/2007 | Scanlon | 431/351 |
| 2008/0213709 A1* | 9/2008 | Clayton et al. | 431/12 |
| 2009/0084328 A1* | 4/2009 | Lyons et al. | 122/13.01 |
| 2009/0302603 A1 | 12/2009 | Clayton | |
| 2010/0065203 A1 | 3/2010 | Tanbour et al. | |
| 2010/0101507 A1 | 4/2010 | Tanbour et al. | |
| 2010/0101508 A1 | 4/2010 | Tanbour et al. | |
| 2010/0101509 A1 | 4/2010 | Tanbour et al. | |
| 2010/0101510 A1 | 4/2010 | Tanbour et al. | |
| 2010/0154724 A1 | 6/2010 | McAnally et al. | |
| 2011/0020759 A1 | 1/2011 | Clayton | |
| 2012/0007355 A1 | 1/2012 | Scanlon | |

FOREIGN PATENT DOCUMENTS

| | | |
|---|---|---|
| CA | 2582285 | 9/2007 |
| GB | 397360 | 8/1933 |
| GB | 2034393 | 6/1980 |
| JP | 2001254834 | 9/2001 |
| KR | 20070028018 | 3/2007 |

OTHER PUBLICATIONS

Rheem Design Pictures, undated.

Office Action from the United States Patent and Trademark Office for U.S. Appl. No. 12/431,525 dated Aug. 14, 2012 (8 pages).

* cited by examiner

WATER HEATERS WITH SEALED DOOR ASSEMBLY

TECHNICAL FIELD

The technology in this disclosure relates to water heaters, particularly to water heaters that have door assemblies, such as those for water heater combustion chambers.

BACKGROUND

Gas fired water heaters traditionally have a water container placed above or adjacent to a combustion chamber and burner assembly. The burner assembly is controlled by a gas control valve which may be responsive to user input, such as a temperature setting. The burner assembly may have a main gas line extending from the gas control valve, through the combustion chamber wall or door, and to the burner. Gas lines have been constructed using various configurations and materials. By way of example, rigid tubing has been used where possible and in some cases threaded fittings are used to connect the rigid tubing to flexible tubing.

It could be beneficial to provide a gas line that is simple, compact, durable, tamper-resistant and economical to construct.

SUMMARY

We provide water heater door assemblies comprising a base plate sized and shaped to substantially sealingly cover an access opening in a water heater combustion chamber and having at least one opening through which a fuel supply line extends at least partly between a burner in the combustion chamber and a gas control valve; and a flexible seal positioned at least partly within the opening comprising an engaging portion substantially sealed to an edge portion of the opening and a through hole that is shaped to receive the fuel supply line and has a size slightly smaller than the size of an outer dimension of the fuel supply line such that the flexible seal and the fuel supply line are friction fit together to form a seal.

We also provide water heaters comprising a water container, a combustion chamber adjacent the water container and having an access opening; a burner associated with the combustion chamber and arranged to combust fuel to heat water in the water container; a control valve that regulates fuel flow from an external fuel source and a door assembly comprising a base plate sized and shaped to substantially sealingly cover an access opening in a water heater combustion chamber and having at least one opening through which a fuel supply line extends at least partly between the burner and a gas control valve; and a flexible seal positioned in the opening comprising an engaging portion substantially sealed to an edge portion of the opening and a through hole that is shaped to receive the fuel supply line and has a size slightly smaller than the size of an outer dimension of the fuel supply line such that the flexible seal and the fuel supply line are friction fit together to form a seal.

We further provide water heaters comprising a water container, a combustion chamber adjacent the water and having an access opening, a burner associated with the combustion chamber and arranged to combust fuel to heat water in the water container; a control valve that regulates fuel flow from an external fuel source; and a door assembly comprising 1) a base plate sized and shaped to substantially sealingly cover the access opening and having at least one rounded opening through which a fuel supply line extends at least partly between the burner and a gas control valve, and 2) a rounded flexible seal positioned at least partly within the opening comprising a flattened, O-ring shaped base portion having a diameter larger than the fuel supply line, an opening edge engaging portion having a channel sized and shaped to sealingly engage the rounded opening that extends radially outwardly from the base portion, and an inner flange extending radially inwardly from the base portion and containing a through hole that is shaped to receive the fuel supply line and has a size slightly smaller than the size of a dimension of the fuel supply line such that the flexible seal and the fuel supply line are friction fit together to form a seal.

We still further provide water heaters comprising a water container, a combustion chamber adjacent the water and having an access opening; a burner associated with the combustion chamber and arranged to combust fuel to heat water in the water container, a control valve that regulates fuel flow from an external fuel source, and a door assembly comprising a base plate sized and shaped to substantially sealingly cover an access opening in the combustion chamber and having at least one opening through which a fuel supply line extends at least partly between the burner and a gas control valve, and a rounded flexible seal positioned at least partly within the opening comprising: 1) an opening edge engaging portion comprising a channel formed in a distal portion of an outer flange extending radially outwardly from a base portion of the flexible seal and 2) a tapered portion extending at least partly radially inwardly from the base portion and forming a through hole that is shaped to receive the fuel supply line and has a size/diameter slightly smaller than the size of an outer dimension of the fuel supply line such that the flexible seal and the fuel supply line are friction fit together to form a seal.

DETAILED DESCRIPTION

Figure 1:
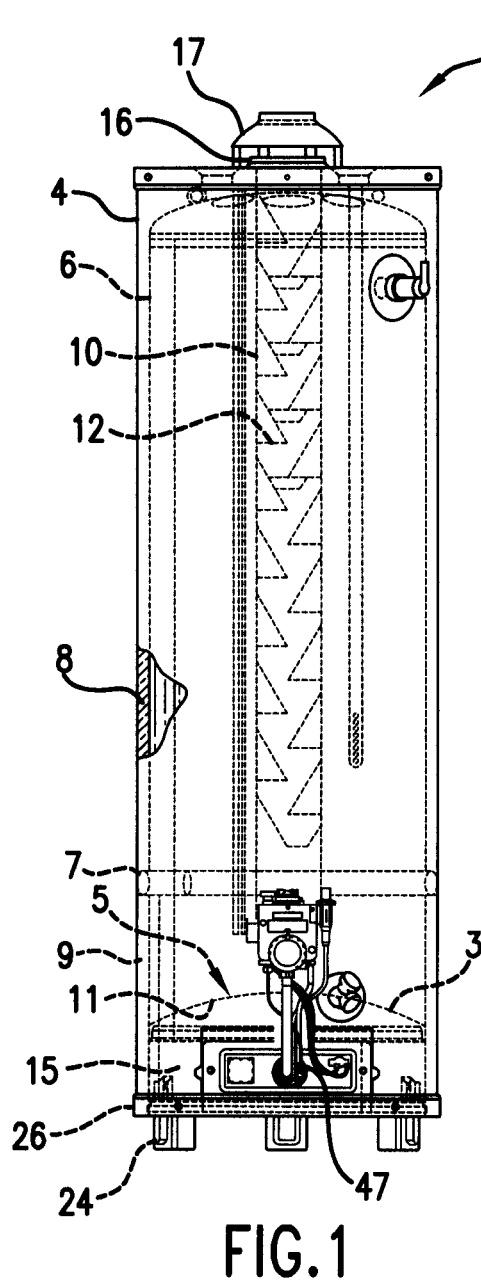
FIG. 1 is a schematic front elevational view of a water heater.

It will be appreciated that the following description is intended to refer to specific aspects of the representative structures selected for illustration in the drawings and is not intended to define or limit the technology of this disclosure, other than in the appended claims.

Figure 2:
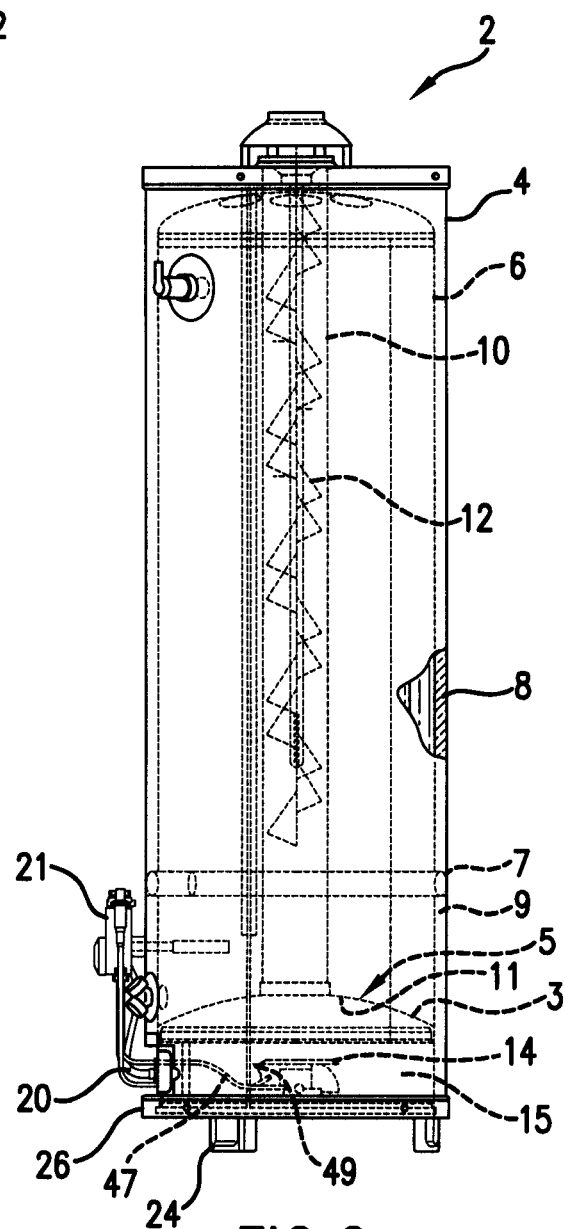
FIG. 2 is a schematic side elevational view of the water heater of FIG. 1.
Figure 3:
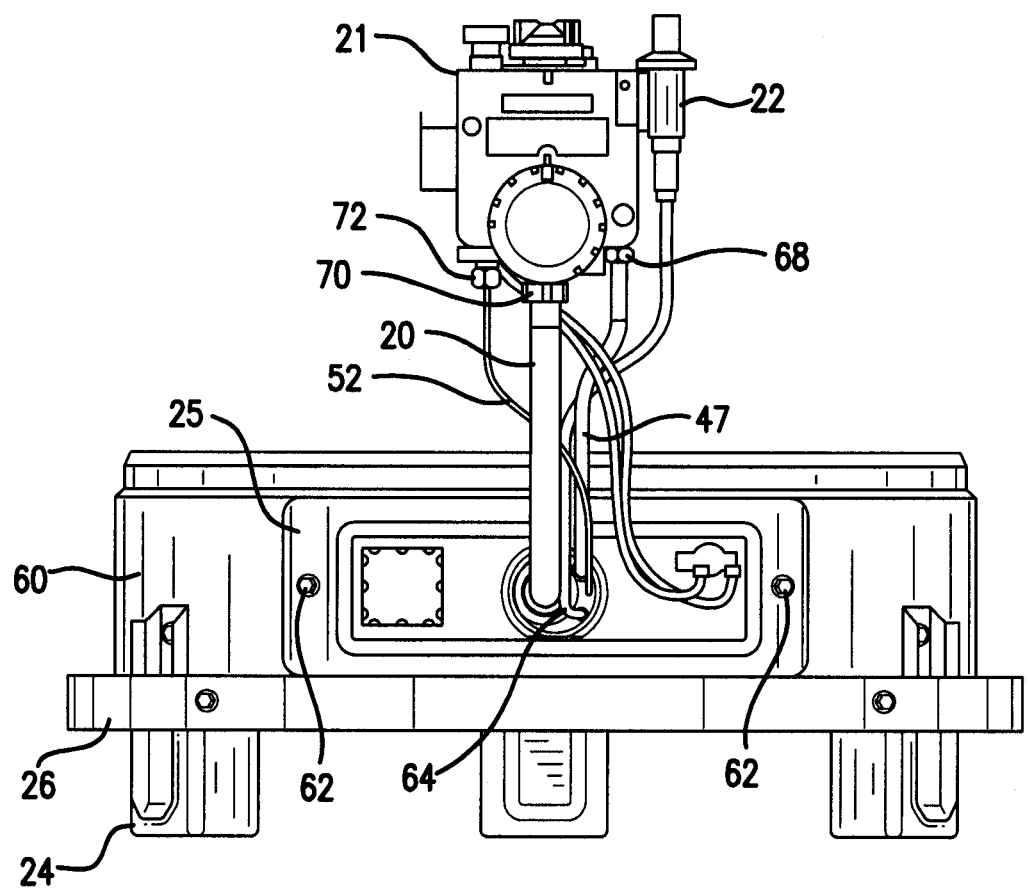
FIG. 3 is a schematic front elevational view of the lower portion of a water heater of the type shown in FIG. 1.
Figure 4:
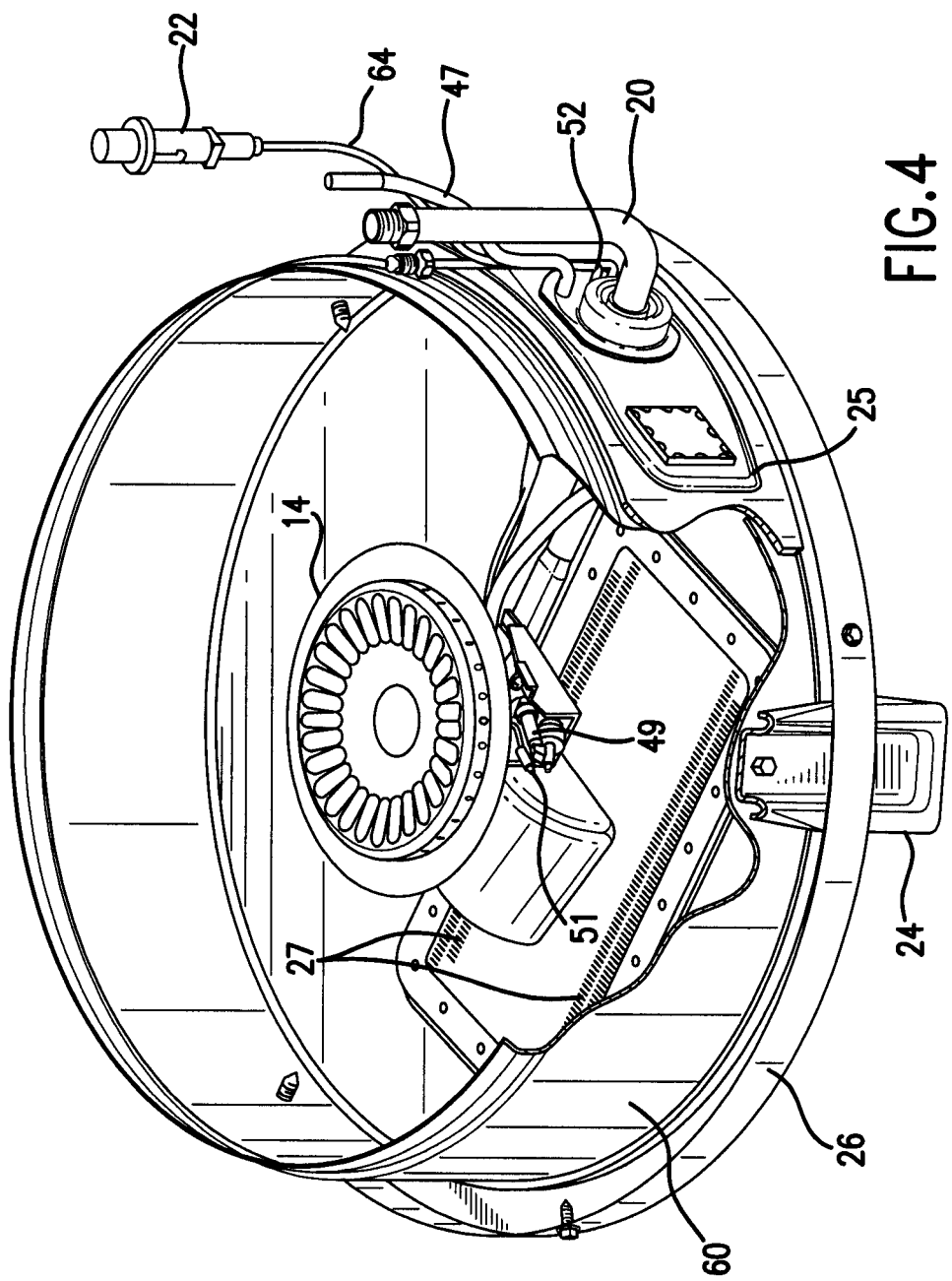
FIG. 4 is a schematic perspective view of a water heater door assembly taken from the water heater shown in FIGS. 1 and 3.
Figure 5:
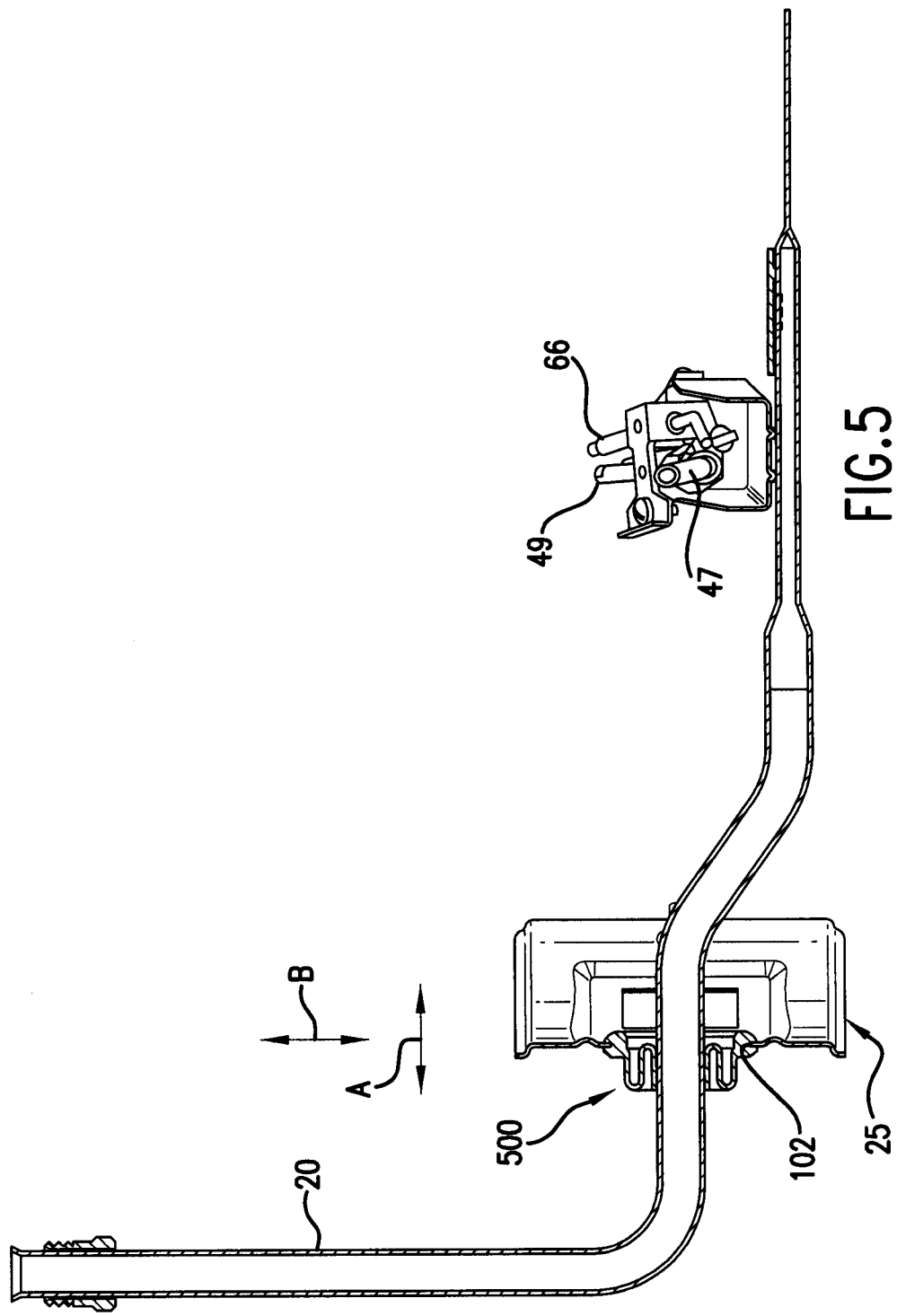
FIG. 5 is a schematic side elevational view, partially taken in section, of the door assembly of FIG. 4.
Figure 6:
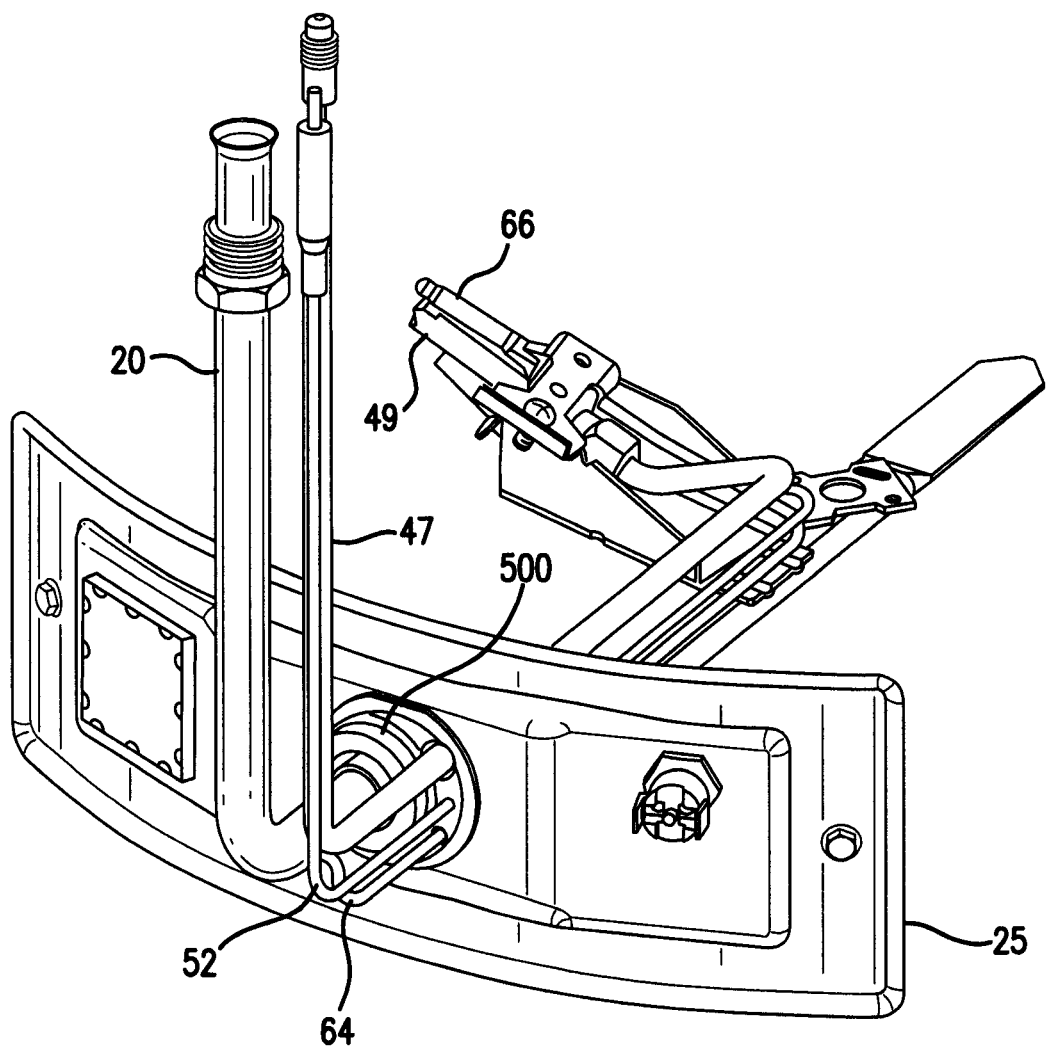
FIG. 6 is a schematic perspective view of the door assembly shown in FIG. 5.
Figure 7:
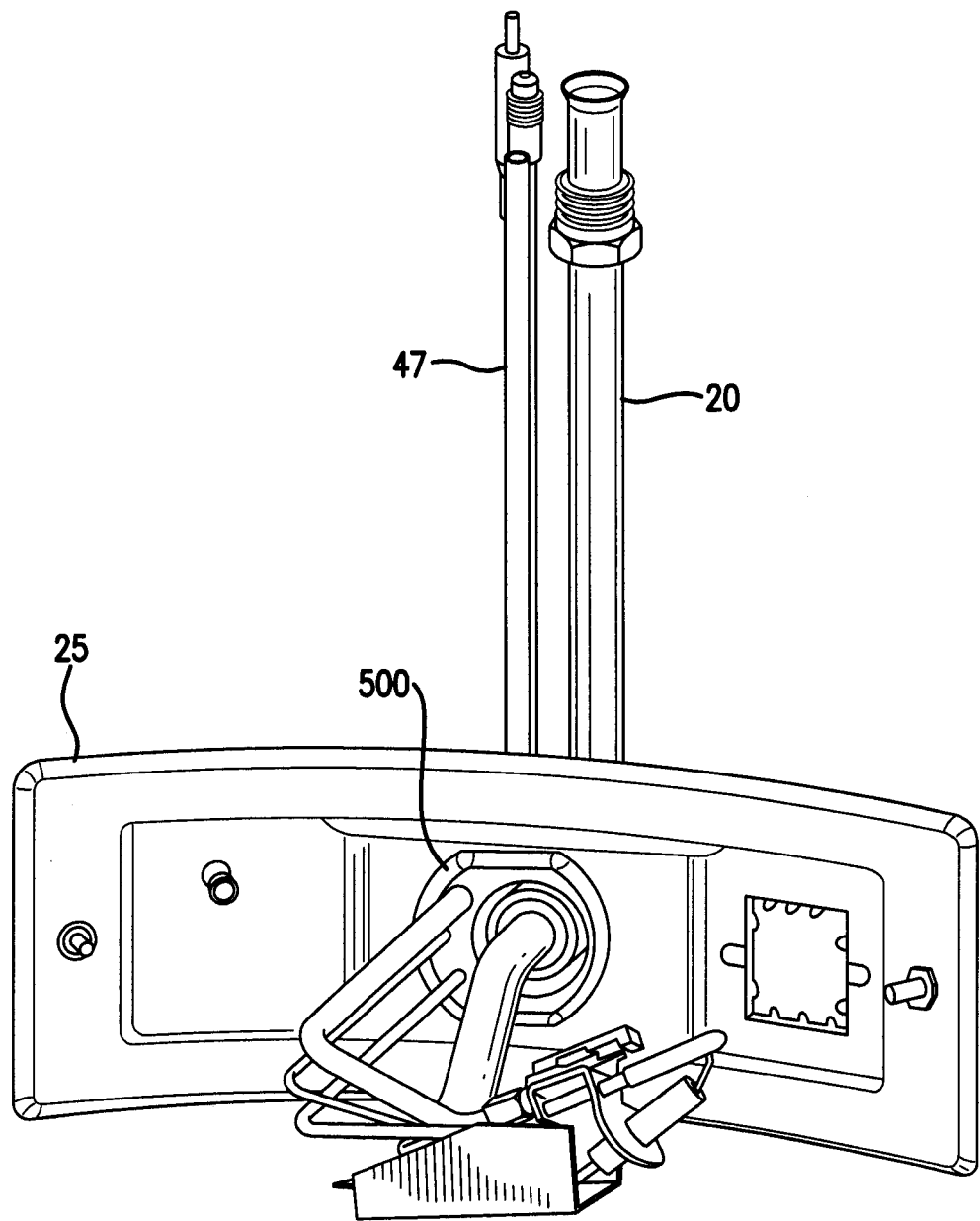
FIG. 7 is a schematic rear view of the door assembly shown in FIGS. 5 and 6.
Figure 8:
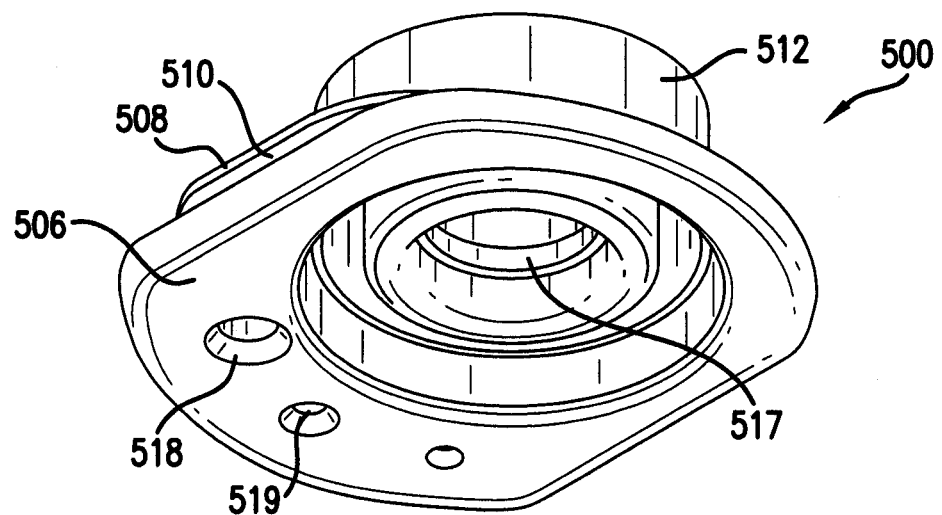
FIG. 8 is a schematic perspective view, taken from below, of a flexible seal utilized in the door assembly shown in FIGS. 5-7.

Turning now to the drawings in general and FIGS. 1-3 in particular, the number "2" designates a storage type gas water heater 2. Water heater 2 includes jacket 4 which surrounds a water tank 6, a main burner 14 in a combustion chamber 15. The term water tank 6 or water container can include conventional storage type water tanks. However, it can include other types of structures through which water passes and/or is retained for a period of time whether extended or just momentary. Thus, the water container can also be as simple a structure as a pipe or conduit through which water flows.

Passing through the center of the tank 6 is a flue 10, in this instance incorporating a series of baffles 12 to better transfer heat generated by the main burner 14. Water tank 6 is preferably of mains pressure capability and is capable of holding heated water. Water tank 6 is preferably insulated by foam insulation 8. Alternative insulation may include fiberglass or other types of fibrous insulation, heating retaining material and the like. Fiberglass insulation 9 surrounds combustion chamber 15 and the lowermost portion of water tank 6. It is possible that heat resistant foam insulation can be used if desired. A foam dam 7 separates foam insulation 8 and fiberglass insulation 9.

Located underneath the water tank 6, within the combustion chamber 15, is the main burner 14 which uses any type of fuel such as oil, natural gas or other gases such as LPG, for example. Other suitable fuels may be substituted. Fuel is provided to the main burner 14 through the main fuel line 20, which is fluidly connected to fuel control valve 21. Fuel control valve 21 supplies fuel to burner 14 by way of main fuel line 20. Main burner 14 combusts a fuel and air mixture and the hot products of combustion resulting rise up through flue 10, possibly with heated air. Water tank 6 is lined with a glass or other type of coating for corrosion resistance. Bottom 5 of water tank 6 is preferably coated on both its interior facing surface 3 and exterior facing surface 11. The thickness of the coating of exterior facing surface 11 may be about half of the thickness of interior facing surface 3. Also, the lower portion of flue 10 is preferably coated on both of its opposing surfaces. The surface exposed to the flue gases has a thickness about half the thickness of the surface exposed to water in water tank 6. It has been discovered that the glass coating helps to prevent scaling of the flue and water tank surfaces.

Combustion chamber 15 also contains a pilot burner 49 connected to fuel control valve 21 by pilot fuel supply line 47. A sheath 52, preferably made of copper, containing wires (not shown) from a flame detecting thermocouple to ensure that in the absence of a flame at pilot burner 49 fuel control valve 21 shuts off the gas supply. The thermocouple may be selected from those known in the art. RobertShaw Model No. TS 750U is preferred.

FIG. 3 particularly shows main fuel line 20 and pilot fuel supply line 47 extending outwardly from a door 25, which provides access to the combustion chamber 15. Door 25 is removably sealable to skirt 60 that forms the side wall of combustion chamber 15. Door 25 is held into position by a pair of screws 62 or by any other suitable means. Pilot fuel supply line 47 and fuel supply line 20 pass through door 25 in a substantially fixed and sealed condition. Sheath 52 also extends through door 25 in a substantially fixed and sealed condition as does igniter line 64. Igniter line 64 connects on one end to an igniter button 22 and a piezo igniter 66. Igniter button 22 can be obtained from Channel Products, for example. Each of pilot fuel supply line 47, fuel supply line 20 and sheath 52 are removably connectable to fuel control valve 21 by compression nuts 68, 70 and 72, respectively. Each of compression nut 68, 70 and 72 are threaded and threadingly engage control valve 21.

The products of combustion pass upwardly and out the top of jacket 4 via flue outlet 16 after heat has been transferred from the products of combustion. The flue outlet 16 discharges conventionally into a draft diverter 17 which in turn connects to an exhaust duct leading outdoors.

Water heater 2 is preferably mounted on legs 24 to raise bottom pan 26 off the floor. Bottom pan 26 preferably has one or more apertures 27 or some other means (not shown) for receiving combustion air. Where bottom pan 26 meets jacket 4, the mating surfaces (made up from surfaces of bottom pan 26 and jacket 4) can be sealed thoroughly to prevent ingress of air or any flammable gas or vapor. The cylindrical wall of jacket 4 (the majority of gas water heaters are cylindrical; however, a cubic or other shaped jacket 4 may be utilized) can be sealed gas tightly so no openings or breaks remain upon assembly and installation.

In particular, gas, water, electrical, control or other connections, fittings or plumbing, wherever they pass through the jacket 4 or bottom pan 26, can be sealed airtight. The joining area of bottom pan 26 to jacket 4 and all service entries or exits to the jacket 4 need not be sealed airtight. It is preferred, however, that the space around burner 14 be substantially air/gas tight except for means to supply combustion air.

Referring now to FIGS. 5-9, a representative structure of a six degrees of freedom flexible joint (hereinafter sometimes referred to as "flexible gasket 500" is shown. The flexible gasket 500 is positioned within an opening 102 in door 25. The opening has an edge portion 104 which is in direct contact with flexible gasket 500.

Flexible gasket 500 includes a base portion 506 and an outer flange 508 that extends radially outwardly from the base portion 506. The outer flange 508 has a channel 510 as particularly shown in FIG. 8 which substantially sealingly engages edge portion 104 of door 25. Channel 510 is preferably shaped similarly to the shape of edge portion 104 to enhance the sealing effect. However, any number of shape channels 510 such as U-shaped, V-shaped and the like may be employed.

Figure 9:
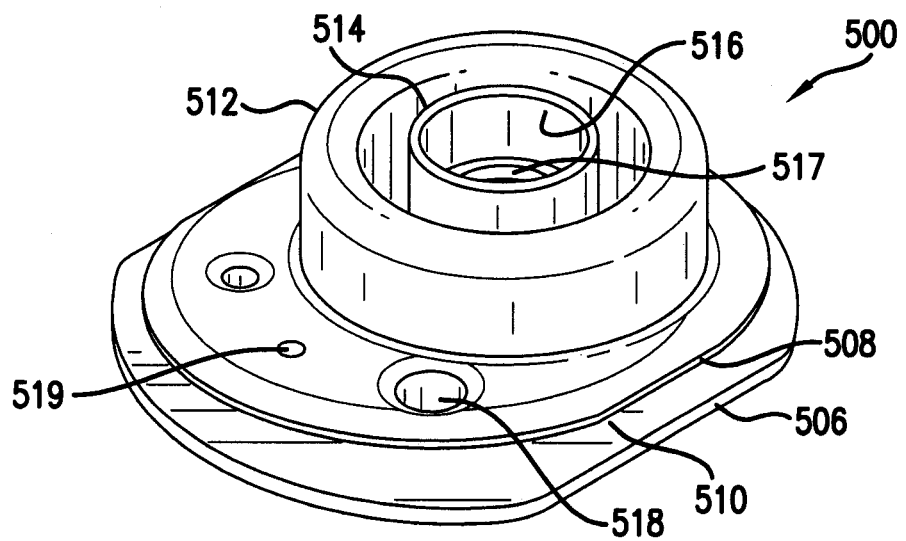
FIG. 9 is a schematic perspective view taken from above of the flexible seal shown in FIG. 8.

A folded portion 512 extends from base portion 506 and has a distal end 514 as particularly shown in FIG. 9 that is shaped to receive main fuel line 20 through a through hole 516. The diameter of through hole 516 may be smaller than the outer diameter of main fuel line 20. In that regard, the diameter of through hole 516 may be slightly smaller than the diameter of main fuel line 20 so that a friction fit between flexible gasket 500 and main fuel line 20 is achieved. This results in a substantial seal against the ingress and egress of air between the exterior and interior of the combustion chamber.

In this particular structure, the diameter of through hole 516 is about the same as or slightly larger than the outer diameter of main fuel line 20. However, there is a radially inwardly extending rib 517 that has an opening, the inner diameter of which is smaller than the outer diameter of main fuel line 20. Preferably, the diameter of rib 517 is slightly smaller than the diameter of main fuel line 20 so that a friction fit between flexible gasket 500 generally and rib 517 in particular, on the one hand, and main fuel line 20, on the other hand, is achieved.

Flexible gasket 500 also has at least one auxiliary opening 518 through which a pilot fuel line (not shown in FIGS. 8 and 9, but shown in FIG. 3 by reference number 47) can extend into the combustion chamber from the gas control valve 21 in a similar substantially sealed manner. Additionally, one or more electrical wires (not shown in FIGS. 5-9, but wire 64 is shown in FIG. 3) can extend through another auxiliary opening such as opening 519, for example. Additional structures may extend through one or more openings of the type such as shown by openings 118 and 119.

Flexible gasket 500 is at least partially made from a flexible material that allows for the installation of main fuel line 20 through flexible gasket 500 in a relatively easy manner. Also, the flexibility of flexible gasket 500 allows for a certain degree of float or six-way movement of fuel line 20 as shown by the arrows labeled A and B in FIG. 5. The flexible nature of flexible gasket 500 allows not only for movement in the directions shown by arrows A and B, but also within a continuum of directions and angles between arrows A and B. This is particularly advantageous during transportation and installation wherein the water heater 2 may be "jostled." This construction allows for the relative movement of the components of the fuel line system without damage occurring.

Folded portion 512 can be configured in any number of shapes and sizes, as well as numbers of folds. Although flexible gasket 500 is shown with three such folds in FIGS. 5-9, any number of folds may be utilized. Moreover, although the folds are shown as U-shaped folds, other shapes of folds may be used such as V-shaped folds that substantially render the folded portion as a pleated portion.

Figure 10:
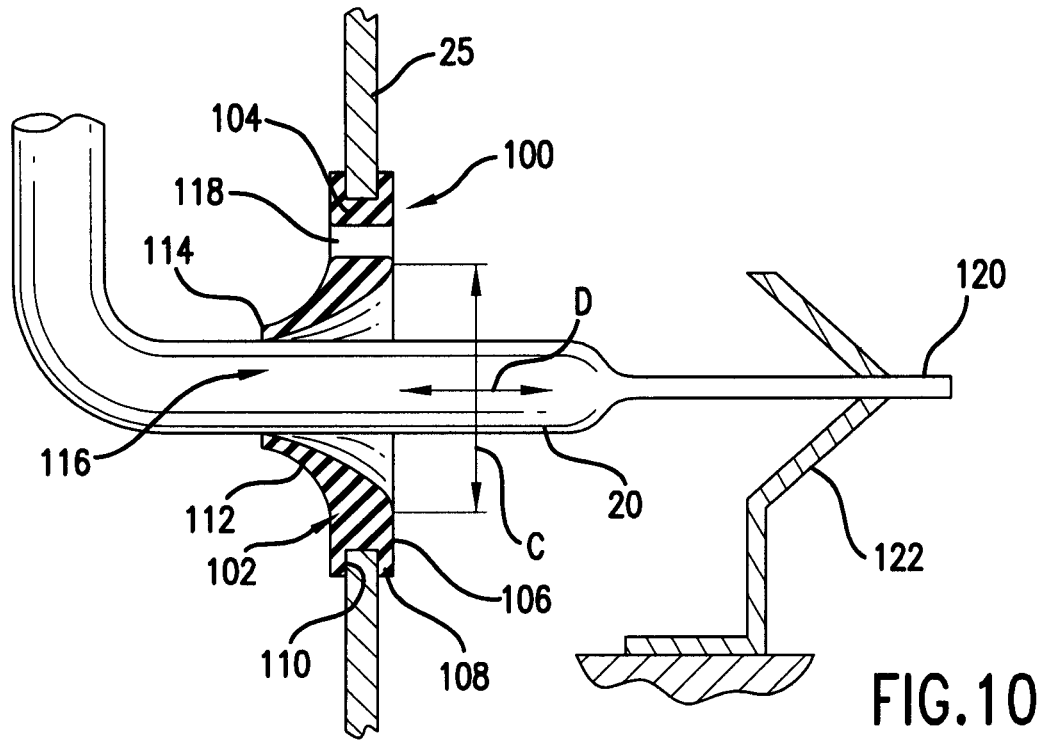
FIG. 10 is a schematic perspective view, taken in section, of another fuel line assembly.

Referring now to FIG. 10, another representative structure of a six degrees of freedom flexible joint (hereinafter sometimes referred to as "flexible gasket 100") is shown. The flexible gasket 100 is positioned within an opening 102 in door 25. The opening has an edge portion 104 which is in direct contact with flexible gasket 100.

Flexible gasket 100 includes a base portion 106 and an outer flange 108 that extends radially outwardly from the base portion 106. The outer flange 108 has a channel 110 which substantially sealingly engages edge portion 104 of door 25. Channel 110 is preferably shaped similarly to the shape of edge portion 104. Thus, any number of shaped channels 110 such as U-shaped, V-shaped and the like may be employed.

A tapered portion 112 extends radially inwardly from base portion 106 and has a distal end 114 that is shaped to receive main fuel line 20 through a through hole 116. The diameter of through hole 116 is smaller than the outer diameter of main fuel line 20. Preferably, the diameter of through hole 116 is slightly smaller than the diameter of main fuel line 20 so that a friction fit between flexible gasket 100 and main fuel line 20 is achieved. This results in a substantial seal against the ingress and egress of air between the exterior and interior of the combustion chamber.

Flexible gasket 100 also has at least one auxiliary opening 118 through which a pilot fuel line (not shown in FIG. 10, but shown in FIG. 3 by reference number 47) can extend into the combustion chamber from the gas control valve 21 in a similar substantially sealed manner. Additionally, one or more electrical wires (not shown in FIG. 10, but wire 64 is shown in FIG. 3) can extend through auxiliary opening 118. Additional structures may extend through one or more openings 118.

Like flexible gasket 500, flexible gasket 100 is at least partially made from a flexible material that allows for the installation of main fuel line 20 through flexible gasket 100 in a relatively easy manner. Also, the flexibility of flexible gasket 100 allows for a certain degree of "float" or six-way movement of fuel line 20 as shown by the arrows labeled C and D in FIG. 10. This is particularly advantageous during transportation and installation wherein the water heater 2 may be "jostled." This construction allows for the relative movement of the components of the fuel line system without damage occurring.

The distal end 120 of main fuel line 20 is secured in place by a mounting bracket 122. This can be made from a flexible material or a non-flexible material. The material can be the same or different from flexible gasket 100. Flexible gasket 100 may be made from any number of materials that are heat resistant to a temperature typical of the vicinity of water heater combustion chambers. Also, the material should be heat resistant over extended periods of time and should be formulated so that it will retain its flexibility over an expected water heater service life. The material should be selected so that it has a degree of strength to resist easy puncture or deterioration. Silicon-based materials are preferred although any material meeting these fundamental guidelines is satisfactory.

Figure 11:
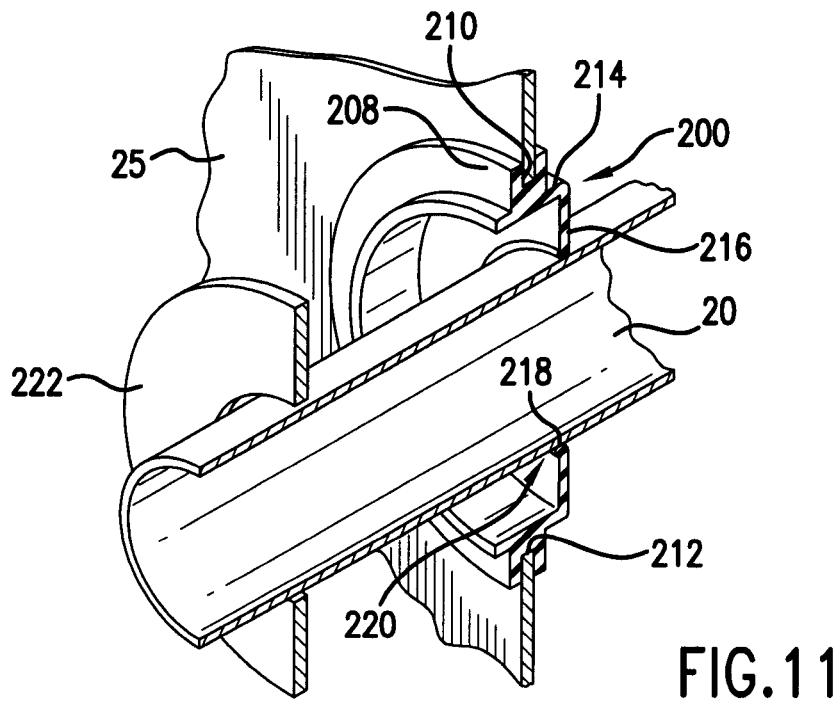
FIG. 11 is a schematic perspective view, taken in section, of another fuel line assembly.

Referring to FIG. 11, another representative flexible gasket structure 200 is shown. That structure contains a radially outwardly extending outer flange 208 that may be similar in function and shape to the flange shown in FIG. 10. It also includes a channel 210 in which a edge opening portion 212 engages channel 210 in a substantially sealed manner. Channel 210 may also have various shapes such as U-shape, V-shape and the like. Flexible gasket 200 also includes a base portion 214 that is substantially a type of O-ring that is flattened such that its inner and outer surfaces are substantially parallel to main fuel line 20. One end of flange 214 has an inner flange 216 that extends radially inwardly toward main fuel line 20. That inner flange also has a beaded portion 218 that engages the outer surface of main fuel line 20. As was the case in FIG. 10, the beaded portion 218 has a diameter that is preferably slightly smaller than the diameter of the outer surface of the main fuel line 20 such that insertion of main fuel line 20 through through hole 220 of beaded portion 218 results in a friction fit and in a substantial air-tight seal. Otherwise, the functionality of flexible gasket 200 is substantially the same as flexible gasket 100 as depicted in FIG. 10.

Main fuel line 20 is shown having a radiation shield 222 that is substantially, circularly shaped and is placed on the inside of the combustion chamber. It is provided with a sufficient size or diameter that substantially blocks radiant heat emanating from burner 14 from directly impacting on flexible gasket 200. This assists in extending the surface life of flexible gasket 200.

Various other sizes and shapes of flexible gaskets may be employed. They should be fixable to the opening 102 and should engage fuel line 20 with a friction fit arranged so that the resulting door assembly, including fuel line 20, is substantially sealed and resists ingress and egress of air from the combustion chamber except by way of designated passageways.

It will be understood that water heater 2 may be constructed with a wide variety of materials, in a wide variety of shapes and sizes. For example, any number of types of burners 14 may be employed, along with various types of fuel control valves 21 and the like. Also, various types of insulation, water containers/tanks and jackets may be employed.

Although the technology of this disclosure has been described in connection with specific representative forms thereof, it will be appreciated that a wide variety of equivalents may be substituted for the specified elements described herein without departing from the spirit and scope of this technology as described in the appended claims.

What is claimed is:

1. A water heater comprising:
   a water tank for storing water to be heated;
   a combustion chamber adjacent to the water tank and defined at least in part by a side wall that include an access opening;
   a burner positioned in the combustion chamber, the burner combusting fuel to create products of combustion for heating the stored water;

a door removably sealed to the side wall to close the access opening, the door including a door opening;

a fuel line extending through the door opening and being connected to the burner for the delivery of fuel to the burner;

a flexible gasket positioned in the door opening around the fuel line to create a gasket seal between the fuel line and the door, to seal against ingress and egress of air between an exterior and interior of the combustion chamber; and a radiation shield disposed around the fuel line within the combustion chamber between the burner and the gasket to substantially block radiant heat emanating from the burner from directly impacting on the gasket.

2. The water heater of claim 1, wherein the radiation shield is larger than the gasket.

3. The water heater of claim 1, wherein the radiation shield has a shield diameter; and wherein the gasket has a gasket diameter that is less than the shield diameter.

4. The water heater of claim 1, wherein the radiation shield is coupled to the fuel line.

5. The water heater of claim 1, wherein the radiation shield includes a shield opening and the fuel line extends through the shield opening.

6. The water heater of claim 1, wherein the flexible gasket includes an auxiliary opening through which a pilot fuel line extends, the pilot fuel line providing fuel to a pilot burner proximate the burner.

7. A method of assembling and operating a water heater, the method comprising:

providing a water tank;

positioning a combustion chamber adjacent the water tank, the combustion chamber including an access opening;

positioning a door over the access opening, the door including a door opening;

positioning a burner in the combustion chamber;

securing a flexible gasket in the door opening, the flexible gasket including a gasket opening;

extending a fuel line through the gasket opening;

creating a gasket seal between the fuel line and the door with the flexible gasket, to seal against ingress and egress of air between an exterior and interior of the combustion chamber;

positioning a radiation shield around the fuel line within the combustion chamber between the burner and the flexible gasket;

supplying fuel to the burner through the fuel line;

combusting the fuel with the burner to heat the stored water; and blocking with the radiation shield radiant heat emanating from the burner, such that the radiant heat does not directly impact the gasket.

8. The method of claim 7, wherein positioning the radiation shield within the combustion chamber includes positioning the radiation shield around the fuel line.

9. The method of claim 7, wherein positioning the radiation shield within the combustion chamber includes providing a radiation shield that is larger than the gasket.

10. The method of claim 7, wherein positioning the radiation shield within the combustion chamber includes providing the radiation shield with a shield diameter; and wherein securing a flexible gasket includes providing a gasket having a gasket diameter that is less than the shield diameter.

11. The method of claim 7, wherein positioning the radiation shield within the combustion chamber includes coupling the radiation shield to the fuel line.

12. The method of claim 7, wherein positioning the radiation shield within the combustion chamber includes providing in the radiation shield a shield opening, and extending the fuel line through the shield opening.

13. The method of claim 7, wherein securing a flexible gasket includes providing a gasket including the gasket opening with a gasket opening diameter; and wherein extending a fuel line through the gasket opening includes extending a fuel line having a fuel line diameter greater than the gasket opening diameter such that the gasket opening is stretched to accommodate the fuel line.

* * * * *